(12) United States Patent
Wiese et al.

(10) Patent No.: US 7,558,038 B2
(45) Date of Patent: Jul. 7, 2009

(54) FIELD UPGRADEABLE CIRCUIT BREAKER FIRMWARE AND PROGRAMMER THEREFOR

(76) Inventors: Gregory S. Wiese, 2607 29th Ave., Marion, IA (US) 52302; Jeremy D. Schroeder, 560 Meadows La., North Liberty, IA (US) 52317

( * ) Notice: Subject to any disclaimer, the term of this patent is extended or adjusted under 35 U.S.C. 154(b) by 391 days.

(21) Appl. No.: 11/355,282

(22) Filed: Feb. 15, 2006

(65) Prior Publication Data

US 2007/0188954 A1 Aug. 16, 2007

(51) Int. Cl.
*H02H 3/08* (2006.01)
*H02H 9/02* (2006.01)
*H02H 7/00* (2006.01)
*H02H 7/26* (2006.01)
*H02H 1/00* (2006.01)
*H02H 73/00* (2006.01)

(52) U.S. Cl. .................... 361/93.2; 361/64; 361/69; 361/114; 361/115

(58) Field of Classification Search ................ None
See application file for complete search history.

(56) References Cited

U.S. PATENT DOCUMENTS

| | | | |
|---|---|---|---|
| 4,885,563 A | 12/1989 | Johnson et al. | |
| 5,943,201 A * | 8/1999 | Walker et al. | 361/64 |
| 5,963,406 A | 10/1999 | Neiger et al. | |
| 6,088,205 A | 7/2000 | Neiger et al. | |
| 6,128,169 A | 10/2000 | Neiger et al. | |
| 6,356,426 B1 | 3/2002 | Dougherty | |
| 6,407,893 B1 | 6/2002 | Neiger et al. | |
| 6,639,769 B2 | 10/2003 | Neiger et al. | |
| 6,671,148 B2 | 12/2003 | Evans et al. | |
| 6,788,508 B2 * | 9/2004 | Papallo et al. | 361/64 |
| 7,236,338 B2 * | 6/2007 | Hale et al. | 361/42 |
| 2005/0280970 A1 * | 12/2005 | Reynolds | 361/93.1 |
| 2006/0176630 A1 * | 8/2006 | Carlino et al. | 361/64 |
| 2007/0273546 A1 * | 11/2007 | Viaro et al. | 340/691.1 |

OTHER PUBLICATIONS

"QO and QOB Miniature Circuit Breakers," copyright 1998, pp. 1-40, published by Square D, USA.

* cited by examiner

*Primary Examiner*—Albert W Paladini
*Assistant Examiner*—Dharti H Patel (57) ABSTRACT

A system (10) is provided for communicating with a residential electronic circuit breaker (18, 20, 22, 24). The system (10) comprises a residential electrical wiring system (16) including a power line (28) and neutral line (32), a residential electronic circuit breaker (18) electrically connected to the residential electrical wiring system (16) and a programmer (34) configured to be selectively connected to the residential electrical wiring system (16) to communicate with the circuit breaker (18).

15 Claims, 5 Drawing Sheets

FIELD UPGRADEABLE CIRCUIT BREAKER FIRMWARE AND PROGRAMMER THEREFOR

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

The present invention relates generally to circuit breakers, and more particularly, to communication with and reprogramming of residential electronic circuit breakers.

In residential electrical distribution systems in which electronic circuit breakers are connected, the breakers are programmed to do specific functions when used in the field. These programs enable the breaker to trip, i.e., to interrupt power when the current reaches the desired value. The programming of the circuit breaker is performed at the site of manufacture. In the event a previously installed electronic circuit breaker fails to operate properly (e.g., nuisance trips), a skilled electrician must make a site visit to remove the circuit breaker and replace it with another. This is quite costly to the consumer and/or company that produces the circuit breaker. Currently, there is no simple means available to the consumer for reprogramming a circuit breaker to remedy the failure.

A case where the means for reprogramming will have a great benefit is with circuit breakers using arc fault detection. There are an infinite combination of loads that can be connected to an electrical system that is protected by a single circuit breaker (i.e., a bedroom with multiple 120 Vac outlets with multiple loads (i.e. computers, lamps, TVs, etc. connected.). As such, it is impossible to test all of these loads to guarantee that there will be no nuisance tripping issues. In addition to the infinite number of loads and combination of loads that can be connected to an electrical distribution system that is protected by a single circuit breaker, there are always new loads being developed everyday. As technology progresses, the characteristics of these loads, as seen in the electrical distribution system, may change. This may result in a nuisance tripping condition. As an example, the loading and operational characteristics of a computer produced by one manufacturer today, that does not cause nuisance tripping, may not have the same characteristics of a computer produced by the same manufacturer in 5 years. Because the computers characteristics have changed after the circuit breaker has been installed into the customer's residence, the only way, today to remedy the nuisance tripping condition is to have an electrician come out and replace the circuit breaker with a new circuit breaker.

In addition to the failure to address such issues as nuisance tripping, current residential circuit breakers cannot be easily upgraded, i.e., the firmware in the circuit breaker's electronics cannot be easily upgraded to add new functions, such as over voltage tripping/alarm functions, power and energy metering, etc. As indicated, the consumer today cannot easily perform a firmware upgrade procedure without requiring an electrician come out and replace the circuit breaker.

Consequently, the demand for re-programmable circuit breakers increases. However, re-programming requires the capability to communicate with the circuit breakers. The ability to communicate with residential circuit breakers enables parameter/value changes (e.g., tripping current values) and the addition of new functionality. Communicating with residential circuit breakers has generally involved separate communications wiring and power. However, separate communications wiring and power supply increases the cost and complexity of implementing communicating residential circuit breakers. The elimination of separate power supplies and complex wiring became advantageous. U.S. Pat. No. 6,671,148 B2 to Evans et al. discloses an electronic communicating residential circuit breaker in which separate power supplies and communication wiring are eliminated.

Residential electrical systems can be used for data communication within a residence. For existing residences, wiring in the electrical systems is advantageous to use because, no additional wiring is required for communications. In one example, data transmissions are routed through a load center, sometimes called a breaker box or fuse box due to residential wiring conventions. The load center is the incoming point for electrical service to the residence and wiring for the residence branches out from the load center. The load center includes a number of circuit breakers (a main circuit breaker and one, to many, branch circuit breaker(s)) for the protection of various circuits within the residence. In these systems, communication is typically established by using a communication protocol addressing system to determine whether a signal is intended for a specific device. U.S. Pat. No. 6,356,426 B1 to Dougherty discloses embodiments of residential circuit breakers in which protocol addressing is used to communicate with an intended breaker. While protocols using communications addressing may be adequate, such methods are complicated for a consumer to use.

There is a need to provide a consumer a means to reprogram his/her circuit breaker. Specifically, there is a need for a simple method, system and device for communicating with and reprogramming of residential circuit breakers.

SUMMARY OF THE INVENTION

In one embodiment of the present invention, a system is provided for communicating with a residential electronic circuit breaker. The system comprises a residential electrical wiring system including a power line and neutral line, a residential electronic circuit breaker electrically connected to the residential electrical wiring system, and a programmer configured to be selectively connected to the residential electrical wiring system to communicate with the circuit breaker.

In another embodiment of the present invention, a method is provided of communicating with a desired electronic circuit breaker to change a program stored within the breaker. The desired breaker is one of a plurality of electronic circuit breakers, each of the plurality of circuit breakers being connected between a power line of a residential wiring system and a load. The method comprises the steps of: a) establishing communication with a desired circuit breaker, the step of establishing communication including the steps of: transmitting a signaling waveform on the power line of the residential wiring system to the desired circuit breaker; detecting the signaling waveform as request to establish communication with the desired circuit breaker; and transmitting a reply waveform to accept the request to establish communication with the desired circuit breaker; b) transmitting a portion of the program to the desired circuit breaker after communication has been established; and c) storing the portion of the program in the desired circuit breaker.

In yet another embodiment of the present invention, a programmer is provided for communicating with an electronic circuit breaker. The programmer comprises a connector selectively connecting the programmer to a portion of a residential electrical wiring system in which the electronic circuit breaker is intended to protect; a microcontroller controlling the operation of the programmer and a communications component electrically connected to the microcontroller and connector communicating with the circuit breaker.

BRIEF DESCRIPTION OF THE DRAWINGS

The accompanying drawings, which are incorporated herein and constitute a part of the specification, illustrate a presently preferred embodiment of the invention, and together with the general description given above and the detailed description of the preferred embodiment given below, serve to explain the principals of the invention.

DETAILED DESCRIPTION OF THE DRAWINGS

Figure 1:
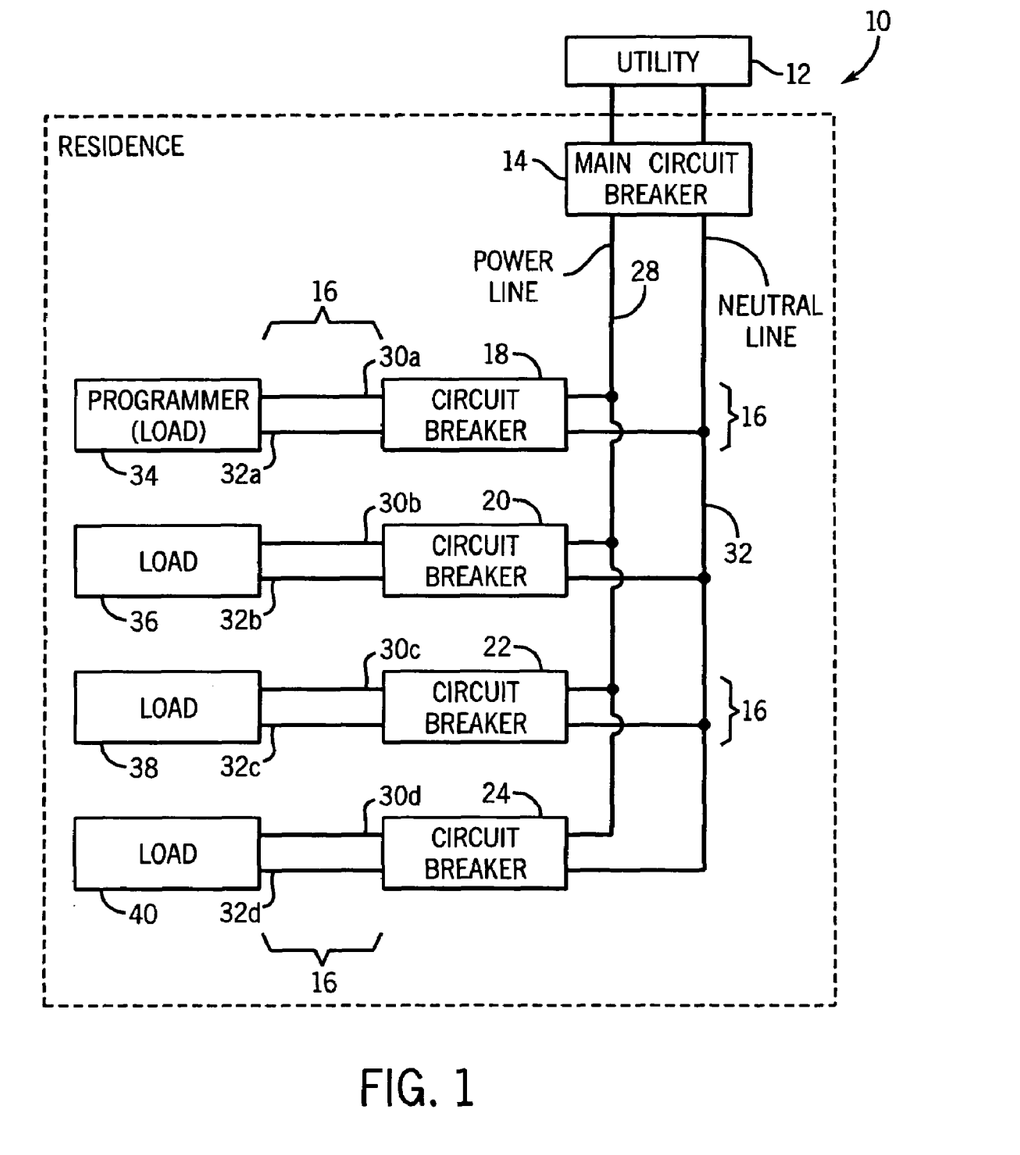
FIG. 1 is a schematic diagram illustrating a residential electrical distribution system incorporating several residential electronic circuit breakers and an electrically connected programmer in accordance with a preferred embodiment of the present invention.

In FIG. 1, there is shown a residential electrical power distribution system 10 in which electrical power from utility 12 is supplied to a residence's loads through main circuit breaker 14 (panel) and residential electrical wiring system 16. Wiring system 16 is merely the wiring within a residence that electrically connects loads and circuit breakers to utility 12 (power source). System 10 includes residential electronic circuit breakers 18, 20, 22, 24 (and main circuit breaker 14) electrically connected to residential wiring system 16. Four breakers are shown (not including main circuit breaker 14), but system 10 typically includes any number of circuit breakers. Each electronic circuit breaker (18, 20, 22, 24) connects to utility 12 through main circuit breaker 14 by way of power line 28 and neutral line 32. Each breaker is connected between utility 12 and a load (as described below) to protect residential electrical wiring system 16.

Residential power system 10 also includes loads 34, 36, 38, 40 electrically connected to electronic circuit breakers 16, 18, 20, 22, respectively, via load power lines 30a, 30b, 30c, 30d and load neutral lines 32a, 32b, 32c, 32d, respectively of residential wiring system 16. (It is noted that neutral line 32 and load neutral lines 32a, 32b, 32c, 32d are the same. Separate reference numbers are used for clarity.) A load is any device or plurality of devices that draw electrical current. For example, a load can be a single device connected to an outlet within a room such as a washing machine, computer, printer, clothes drier, heater, or multiple devices connected in parallel or multiple outlets in one room. Each room of a residence typically has several electrical outlets for supplying current to loads 34, 36, 38, 40. Load 34 in FIG. 1 is a programmer (hereinafter referred to as programmer 34) for communicating with a desired circuit breaker, i.e., breaker 18. Programmer 34 is described in more detail below with respect to FIG. 2.

Each residential electronic circuit breaker is appropriately connected to protect a portion of the electrical wiring system 16. In some cases, the portion of the residential electrical wiring system 16 may be a single room in a residence with multiple outlets. Specifically, each breaker is designed to protect the components that use current flowing from power line 28 to a particular load (34, 36, 38, 40) from damage caused by electrical anomalies such as over current, under voltage, arc fault, and ground fault conditions. A breaker provides protection by interrupting current, or removing power to the downstream loads when an electrical anomaly occurs. Each breaker includes a variety of components to perform this protection. These components are described below.

Figure 2:
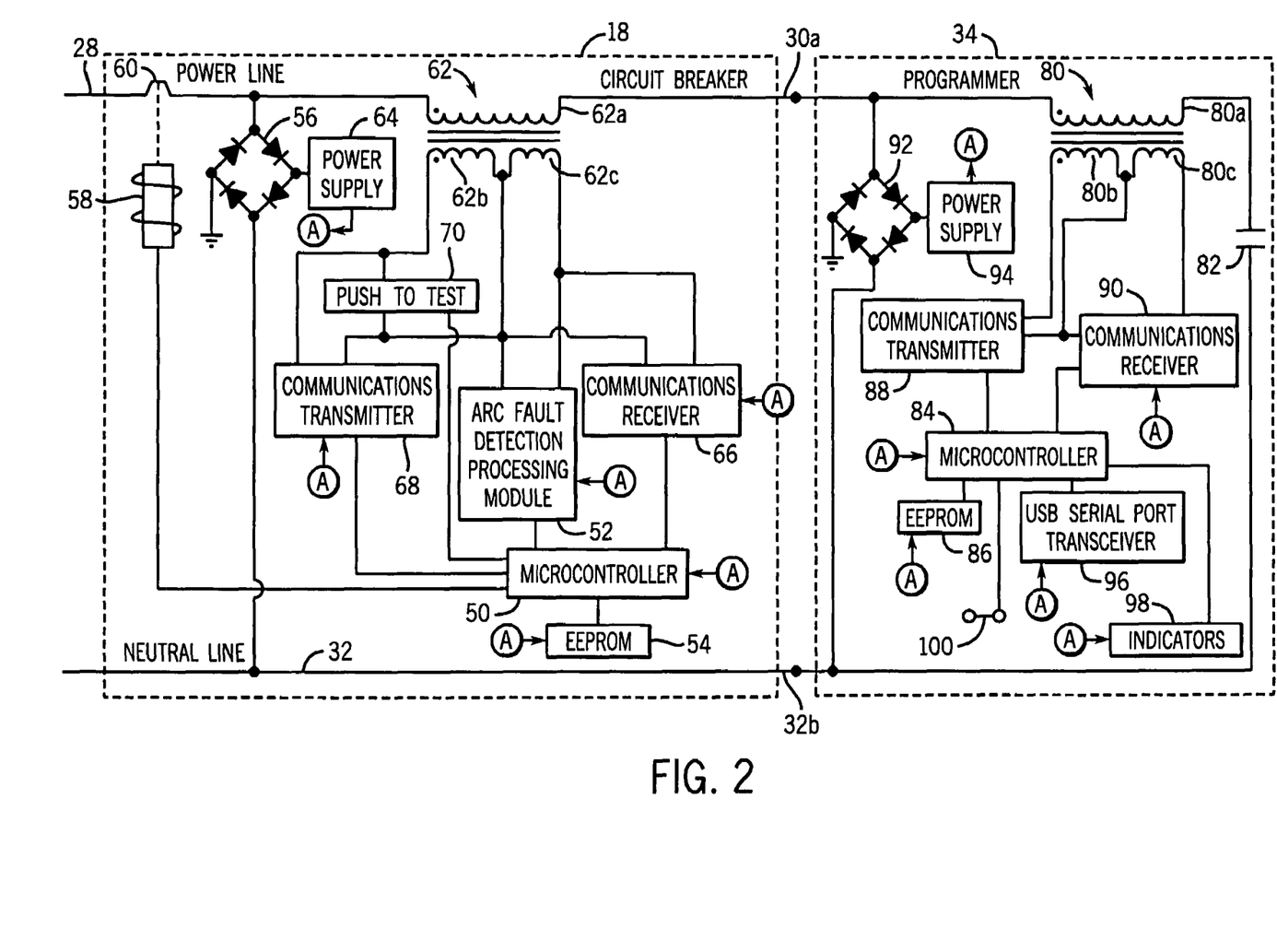
FIG. 2 is an enlarged detailed schematic diagram illustrating a programmer communicating with a desired circuit breaker shown in FIG. 1.

FIG. 2 illustrates an enlarged view of electronic circuit breaker 18 (desired breaker for communication). As previously mentioned, programmer 34 is electrically connected to the portion of residential wiring system 16 in which breaker 18 is intended to protect. In this case, programmer 34 is installed into an outlet of a room's wiring system protected by breaker 18. Proper connection is important to ensure correct communication between programmer 34 and breaker 18 (and firmware reprogramming) in accordance with invention as discussed below. It is important to note that each breaker has the same components. However, for purposes of this discussion, only the components of breaker 18 will be described herein. Programmer 34 preferably includes a conventional plug (not shown) to enable programmer 34 to install into a standard 120 voltage AC wall outlet. However, other devices may be used to couple programmer 34 to the wall outlet (or to that portion of residential wiring system 16 protected by a desired breaker).

In the preferred embodiment, residential electronic circuit breaker 18 (and all other breakers) is an arc fault circuit breaker that operates to protect electrical wiring. However, other electronic circuit breakers can be used such as a ground fault circuit breaker. Breaker 18 has a number of conventional components including microcontroller 50, arc fault detection processing module 52 and EEPROM 54. Both module 52 and EEPROM 54 are electrically connected to microcontroller 50. Breaker 18 further includes conventional components such as a full wave bridge rectifier 56, solenoid 58, circuit breaker contacts 60, transformer 62 and power supply 64. Transformer 62 is a high frequency DI/DT (change in current divided by time) sensor used to sense current on power line 28 in a conventional way. In this implementation, transformer 62 can also be used (dual use) for communication in accordance with the present invention described in detail below.

In general, microcontroller 50 functions to operate breaker 18. As is known, microcontroller 50 will determine whether an "arc" signal from arc fault module 52 satisfies the requirements to active solenoid 58 (i.e., trip breaker 18) to mechanically open circuit breaker contacts 60 to prevent further current from flowing in the portion of residential wiring system 16. EEPROM 54 is a re-writable non-volatile memory (flash storage) device for storing the firmware. Microcontroller 50 uses the firmware for operating breaker 18. The firmware is typically loaded into the circuit breaker at the manufacturing site. The firmware is a software program that includes coded instructions and data parameters such as "arc" tripping and other values. Note that EEPROM 54 is shown in FIG. 2 as a separate component from microcontroller 50. The microcontroller, however, may include the EEPROM (as one component) in an alternative embodiment.

Arc fault detection processing module 52 is used to condition (i.e., filter and amplify) the waveform signal from the secondary winding of transformer 62 to enable microcontroller 50 to properly process the waveform signal. Bridge rectifier 56 functions conventionally to convert from an AC waveform to a full wave rectified DC waveform coming from power line 28. Power supply 64 converts the full wave rectified signal into a true DC power signal. This DC power signal is supplied to various electronic components in breaker 18 (as described herein and shown in FIG. 2) including microcontroller 50, EEPROM 54, arc fault detection processing module 52, communications transmitter 88 and communications receiver 66.

In accordance with the present invention, transformer 62 is not only used for arc detection, it is also used for communication over power line 28 and neutral line 32. In particular, transformer 62 includes primary winding 62a, typically consisting of a single winding that is connected between circuit breaker contacts 60 and line 30a (connected to a wall outlet that is not shown) and a secondary winding having two separate windings 62b, 62c. Winding 62b is used to test the functionality of breaker 18 (using push to test box 70) while winding 62c is used to sense arc faults that occur on power line 28. Communications receiver 66 and communications transmitter 68 (also included within breaker 18) are connected between microcontroller 50 and transformer 62. In the preferred embodiment described, test winding 62b of transformer 62 is connected to communications transmitter 68 to enable it to transmit communication waveforms onto power line 28 (by inducing a waveform on primary 62a) while sense winding 62c of transformer 62 is connected to communications receiver 66 to receive (by induction from winding 62a to secondary winding 62c) a communications signaling waveform from power line 28 (via line 30a). It should be understood by those skilled in the art that the discussion herein about power line 28 is the same (equivalent) as line 30a when circuit breaker contacts 60 are closed.

In the preferred embodiment, communications transmitter 68 creates a reply waveform (sawtooth) as instructed by microcontroller 50. Specifically, microcontroller 50 creates digital streams ("highs" and "lows"). Transmitter 68 then conditions or shapes that stream into as a waveform with a sawtooth waveform. Transmitter 68 may also include an amplifier to amplify the waveform for coupling onto power line 28 via transformer winding 62b. Details of the method of communication between breaker 18 and programmer 34 are described below. Suffice it to say, microcontroller 50 essentially controls the timing and spacing (start/stop) of the reply waveform pulses. Alternatively, communications transmitter 68 will control the waveform parameters (timing, spacing and waveshape) itself.

Communications receiver 66 is designed to measure the signal (voltage) generated by the secondary winding 62c. Communications receiver 66 includes a comparator (not shown) that compares. i.e., interprets the pulses as a digital value (i.e., "high or low"). These values are used by microcontroller 50 to detect communication. Alternatively, an A/D converter may be used instead of a comparator to convert the waveform (pulses) into digital form. In this alternative case, the voltage will be measured across a resistor within receiver 66. A high impedance resistor is used to ensure virtually no current is drawn. In the event amplification and filtering of the signal from secondary winding 62b of transformer 62 is needed to measure the signal, communications receiver 66 will also include amplifiers and filters (not shown). Both communications receiver 66 and communications transmitter 68 are powered by power supply 64.

Programmer 34 is also shown in detail in FIG. 2. Programmer 34 is a handheld device that can be used by a consumer to reprogram the firmware in any single residential electronic circuit breaker using residential wiring system 16. Residential breaker 18 is the desired breaker for communication and reprogramming. Programmer 34 is designed to plug into any wall outlet. Programmer 34 includes a high frequency transformer (sensor) 80 and capacitor 82 in series with transformer 80. Transformer 80 is preferably the same transformer used by breaker 18 to which programmer 34 will reprogram. In this embodiment, transformer 80 has two separate winding 80b, 80c on its secondary.

Programmer 34 uses these windings to communicate with breaker 18 over power line 28 (via line 30a) and line 32 (via line 32a). Specifically, winding 80b is used for transmitting a signaling waveform onto power line 28 (via line 30a) while winding 80c is used for receiving communication off of power line 28 and neutral line 32 (via lines 30a and 32a respectively). Capacitor 82 is used to provide a low impedance return path for the high frequency communications current that will be placed on power lines 28 and 32 (via lines 28a and 32a, respectively). It is desired to employ a high current pulse to exceed (i.e. drown out) the noise on power line 28 and line 32.

Programmer 34 further includes microcontroller 84 for controlling the operation of programmer 34 in accordance with the firmware stored in EEPROM 86 (also included within programmer 34), a non-volatile storage (memory) device. The firmware is a program (i.e., code) that dictates the operation of microcontroller 84 and in general, the operation of the programmer 34. In accordance with the preferred embodiment, EEPROM 86 stores two firmware programs. The first program is used to operate programmer 34 as described and the second program is the one to be uploaded into circuit breaker 18. Note that EEPROM 86 is shown in FIG. 2 as a separate component from microcontroller 84. The microcontroller, however, may include the EEPROM (as one component) in an alternative embodiment.

Programmer 34 also includes communications transmitter 88 and communications receiver 90 connected between microcontroller 84 and windings 80b and 80c (of secondary windings of transformer 80), respectively. Communications transmitter 88 and communications receiver 90 function similarly (within similar internal components) as communications transmitter 68 and communications receiver 66 of breaker 18. Communications transmitter 88 generates a sawtooth waveform (signal) for communicating with breaker 18. Specifically, microcontroller 84 generates a digital stream and communications transmitter 88 conditions or shapes the stream into a sawtooth waveform. Microcontroller 84 is an off the shelf chip that essentially controls the timing and spacing of the pulses in the sawtooth waveform. Communications transmitter 88 may also include an amplifier for amplifying the resulting sawtooth waveform transmitted to transformer 80 coupled onto power line 28. Programmer 34 includes full wave rectifier 92 that full wave rectifies the 120V ac and supplies it to power supply 94 for further conditioning. Power supply 94 converts that waveform into a DC voltage which is supplied to various components within programmer 34 including microcontroller 84, communications transmitter 88, communications receiver 90. EEPROM 86, indicators 98 and USB serial port transceiver 96. Transformer 80, communications transmitter 88 and communications receiver 90 together may sometimes be referred to as a communication component.

In order to download the firmware to programmer 34, programmer 34 incorporates a USB serial port transceiver 96 to receive the firmware from a personal computer (PC) directly. Alternatively, the updated breaker firmware may be transmitted to programmer 34 via wireless communication equipment incorporated within (or attached to) USB serial port transceiver 96 and the personal computer's USB port (not shown). Programmer 34 is powered by the 120 Vac power from a wall outlet when programmer 34 is connected (for reprogramming) and is powered by PC's USB port when the breaker firmware is transferred from the PC. If a wireless communications link is used to download the circuit breaker's firmware from the PC to programmer 34, programmer 34 could be designed to be powered by batteries or by plugging into 120 Vac wall outlet.

Programmer 34 also includes a set of indicators 98 connected to the microcontroller 84. Indicators 98 are a set of LED used to indicate various conditions of programmer 34 including "power on" (on-off of programmer), "successful download" (of the firmware from PC), "successful upload" (of firmware from programmer to desired circuit breaker) and "OK" (meaning that the programmer's electronics are functioning properly). There will also be a button 100 for initiating the uploading of the firmware from programmer 34 to a desired circuit breaker.

Microcontroller 84 is used to accept breaker's firmware (digital data stream of information), perform error handling of the communications between the personal computer and EEPROM 86, notify both the personal computer and user that a successful download has occurred and notify both programmer 34 and the user that a successful upload of the firmware has occurred between programmer 34 and desired (programmable) circuit breaker. Microcontroller 84 will illuminate the appropriate LED to indicate these various conditions.

Figure 3:
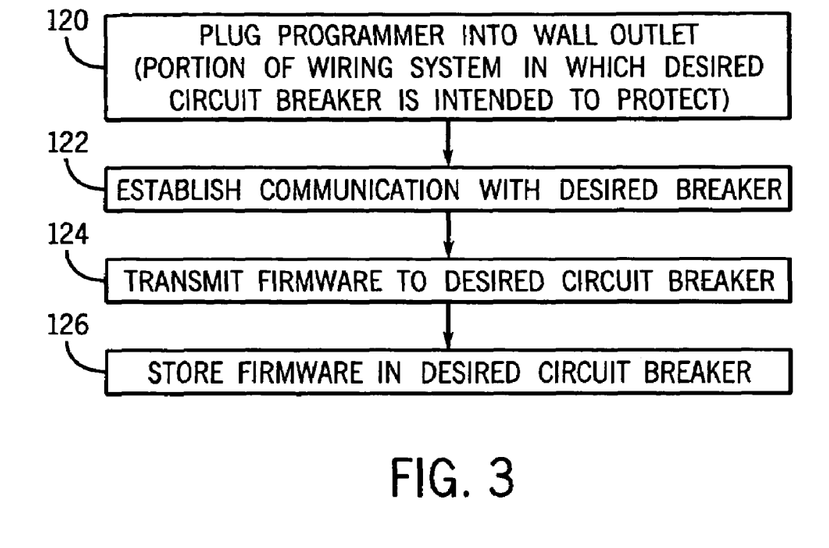
FIG. 3 is a flowchart illustrating the communication process between the programmer and the desired residential electronic circuit breaker shown in FIG. 1.

The method of programmer 34 operation (including communication) is hereinafter described with respect to FIG. 3-6. Referring to FIG. 3, execution begins with step 120 in which programmer 34 is plugged into a wall outlet, i.e., is connected to the portion (of residential wiring system 16) in which the desired breaker is intended to protect. This ensures that programmer 34 will communicate with the desired breaker (i.e., this ensures proper direction of communication current pulses that flow through the desired breaker). In this case, the breaker 18 is chosen as the desired breaker for reprogramming.

In the next step 122, programmer 34 establishes communication with breaker 18. In order to accomplish this task, a communications link is set up. Instead of using a conventional addressing method for choosing a particular breaker that is connected to the power line, programmer 34 uses a signaling method in accordance with the preferred embodiment of the invention. In this method, all circuit breakers receive or see this signaling, but only the circuit breaker that protects the circuit to which programmer 34 is connected will communicate with programmer 34. Programmer 34 executes this signaling method by transmitting a signaling waveform on power line 28 (via line 30*a*) of residential wiring system 16, as set forth in execution step 122A in FIG. 4.

Figure 5A:
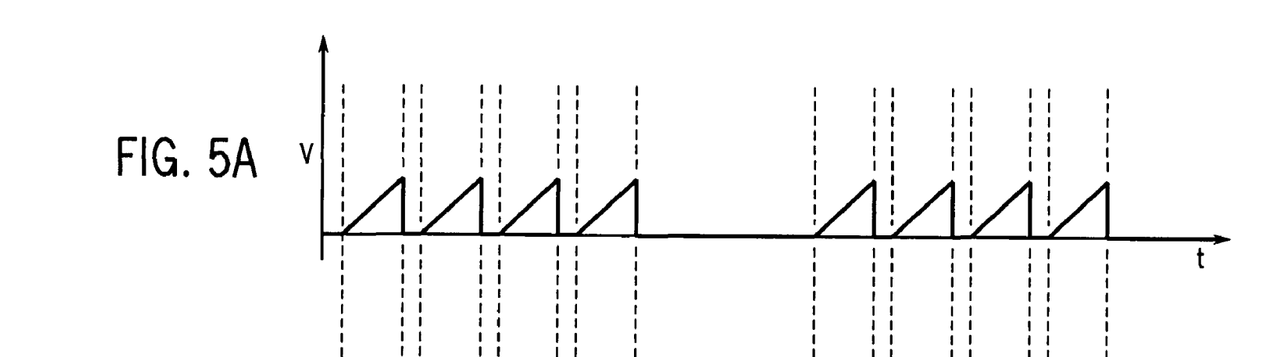
FIG. 5A is a graph of a signaling waveform generated within the programmer shown in FIG. 1.
Figures 5B, 5C:
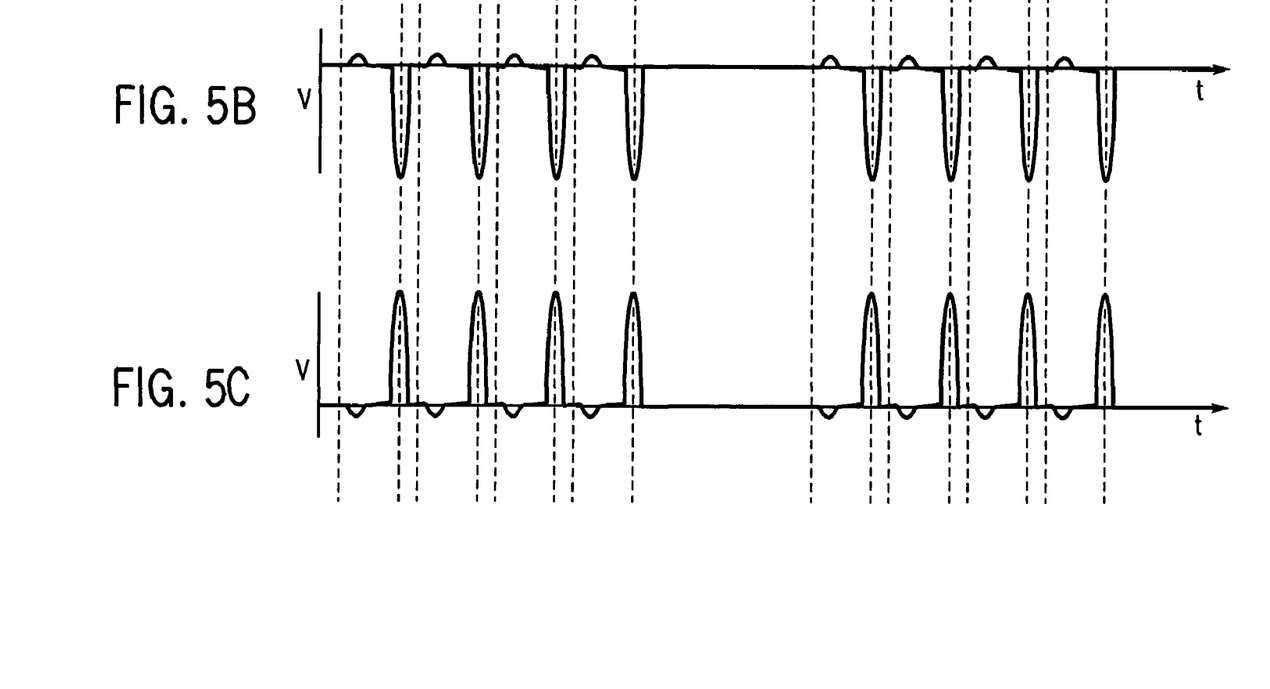
FIG. 5B is a graph of a voltage waveform measured across a secondary winding of a transformer within the desired residential circuit breaker shown in FIG. 1.
FIG. 5C is a graph of a voltage waveform measured across a secondary winding of a transformer within another residential circuit breaker shown in FIG. 1.

Communications transmitter 88 generates a repetitive waveform on winding 80*b* (secondary winding) of transformer 80. The waveform is preferably the sawtooth waveform shown in FIG. 5A. This waveform thereafter induces a waveform on primary winding 80*a*. The resulting waveform that is coupled onto power line 28 (via line 30*a*) will be a series of current pulses whose magnitude corresponds to the rate of change in the original sawtooth waveform. Since the original sawtooth waveform has a slow rise time and quick fall time, the magnitude of the current pulses will vary depending on the slope of the signal waveform. By programming circuit breaker 18 to ignore pulses with small magnitudes, the series of pulses will appear to be polarized when measured on secondary winding 62*c* of transformer 62 (of breaker 18). In the preferred embodiment, this waveform (on the secondary) will have a negative polarity. This waveform is shown in FIG. 5B. Programmer 34 continues to repetitively transmit the sawtooth waveform until circuit breaker 18 responds or a time out occurs.

Execution moves to step 122B wherein breaker 18 detects the repetitive waveform with negative polarity as a request to establish communication with breaker 18. All circuit breakers (18, 20, 22, 24) are programmed to detect a repetitive negative waveform as a request to communicate. As discussed above, all circuit breakers will receive a waveform of certain polarity. However, only breaker 18 which protects the circuit to which programmer 34 is loaded (i.e., connected), will receive a repetitive waveform with negative polarity. The hardware and firmware in each breaker contains firmware or code that allows the circuit breaker to receive and accept a waveform of negative polarity as a signal to communicate. The remaining breakers 20, 22, 24 will receive a waveform with positive polarity. The waveform is shown in FIG. 5C. In detail, the current pulses through breaker 18 will flow from the load side to the power line side while the current flowing through all other breakers 20, 22, 24 will flow from power line side to the load side. Therefore, all breakers other than breaker 18 will have pulses with positive polarity and these breakers 20, 22, 24 will be programmed to ignore communications that have positive polarity pulses. This is the preferred embodiment of the signaling method.

Figure 6A:
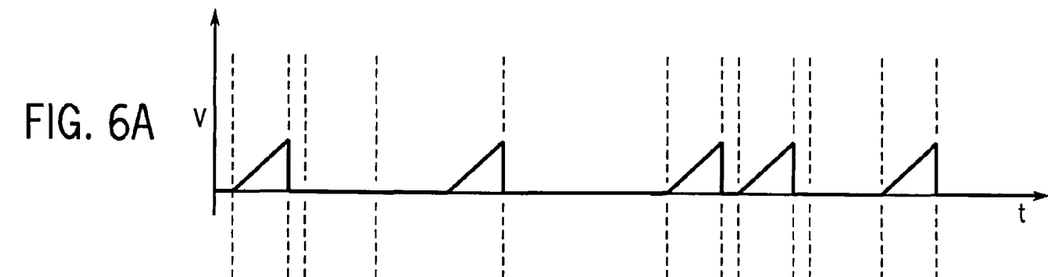
FIG. 6A is a graph of a reply waveform generated by the desired beaker shown in FIG. 1.
Figure 6B:
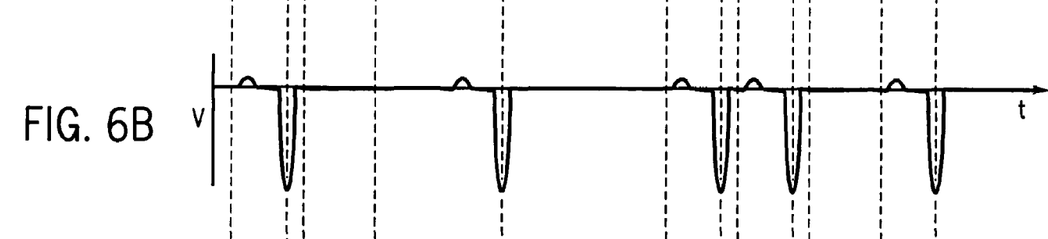
FIG. 6B is a graph of a voltage waveform measured across a secondary winding of the programmer shown in FIG. 1.
Figure 6C:
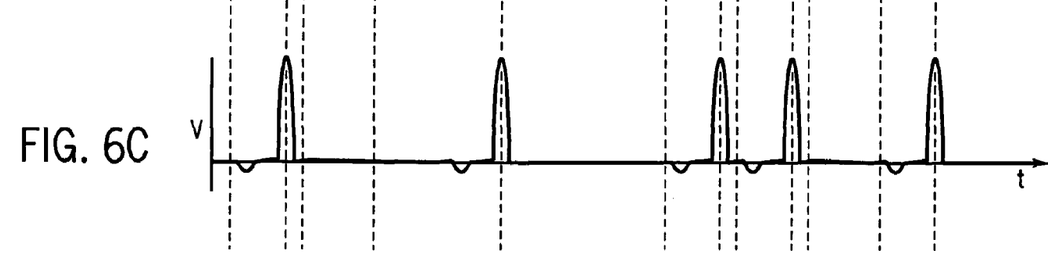
FIG. 6C is a graph of a voltage waveform measured across a secondary winding of a transformer of another residential electronic circuit breaker shown in FIG. 1.

Once breaker 18 detects the negative polarity waveform, breaker 18 transmits a reply waveform on secondary winding 62*b* of transformer 62 as an acknowledgement that communication has been established, as set forth in step 122C. This reply waveform is shown in FIG. 6A. The waveform has pulses of similar shape to those pulses of the signaling waveform, but the waveform has a different number of pulses and time delay between each pulse. The reply waveform induces a waveform on the primary winding 62*a* of transformer 62 which generates a waveform on power line 28 (via line 30*a*). A resulting waveform of negative polarity is measured on winding 80*c* of transformer 80 of programmer 34. As a result of the reply waveform, breakers 20, 22, 24 will also receive a waveform but with positive polarity (shown in FIG. 6C). The circuit breakers will be programmed to ignore a waveform of positive polarity. In step 122D, programmer 34 will detect the reply waveform as an acceptance to communicate. Specifically, programmer 34 will decipher the train of pulses to determine if the train is a message from breaker 18 and if the message means that communications has been successfully established between programmer 34 and breaker 18. If a communication link has been established, breaker 18 will enable proper uploading (some or all) of the firmware to breaker 18.

It is important to note that the signaling method for establishing communication can be achieved using other signal generating and detection schemes including a reverse polarity scheme. Another scheme may employ an unsymmetrical waveform in a particular direction (where polarity is not material). In yet another schemes for example, the breakers can be programmed to analyze the polarity of both sides of the signaling waveform across (the secondary winding) the breaker's transformer to detect communication.

Another method for signaling a single circuit breaker in a load center for establishing a communications link is to use a ground to neutral transformer. Ground to neutral transformers are usually found in ground fault circuit breakers to cause the circuit breaker to trip if the load neutral is connected to earth ground. In this embodiment of the invention, the programmer is designed to connect and disconnect the ground conductor and neutral conductor together in a repetitive pulsed pattern such that the circuit breaker sees the signaling but does not trip due to a ground to neutral condition. Since the grounded neutral condition is only detected on the load side of circuit breakers, only the circuit breaker to which the programmer is considered to be a load will see the signaling from the programmer.

Figure 4:
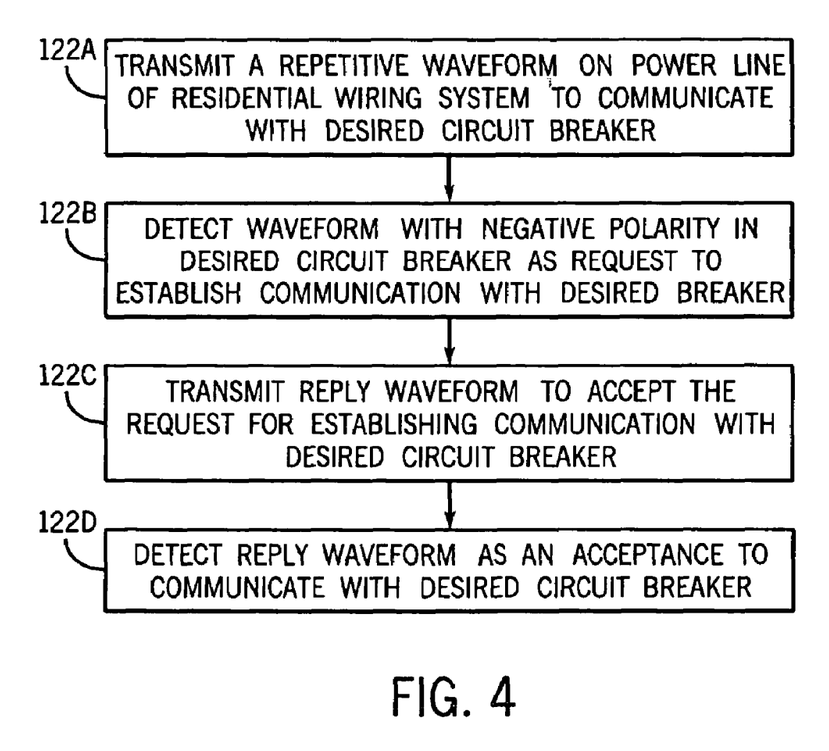
FIG. 4 is a flowchart illustrating the detailed steps of a step in the communication establishment process shown in FIG. 3.

Returning now to step 124 in FIG. 4, the updated firmware is transmitted to reprogram breaker 18. The firmware (all or a portion thereof) is stored in EEPROM 54 at step 126. Data transfer is preferably accomplished using a similar pulse train sent back and forth to communicate, i.e., re-program the breaker 18. Once programmer 34 successfully signals a desired circuit breaker, the desired breaker will broadcast, i.e., send its address to programmer 34 via a power line carrier protocol incorporated within programmer 34 and each breaker. Therefore, programmer 34 and breaker 18 can effectively and efficiently communicate (i.e., talk back and forth) with each other using this format. This communication method may be accomplished using a standard commercially available power line protocol such the PL 3120 or PL 3150 (Lon Works) by Echelon. Another communications method is to embed wireless communication circuitry into a breaker, pulse width modulation, pulse code modulation or fiber optics. In addition, firmware may be transmitted using an Ethernet protocol to power line protocol incorporated into programmer 34 and the electronic circuit breakers.

With the system and method in accordance with the present invention, a circuit breaker's firmware can be modified if the breaker does not function properly with a load (i.e., nuisance tripping) or if a new function is desired (to be added or enhanced, e.g., power metering, advanced tripping functions such as undervoltage). The circuit breaker does not require replacement or removal. Instead, the circuit breaker can be easily upgraded through the customer's existing wiring system. This saves the customer the cost of a new circuit breaker and the service charge for an electrician.

The foregoing description of a preferred embodiment of the invention has been presented for purposes of illustration and description. It is not intended to be exhaustive or to limit the invention to the precise form disclosed and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A method of communicating with and reprogramming a desired residential electronic circuit breaker to change a program stored within the breaker, the desired residential circuit breaker being one of a plurality of residential electronic circuit breakers, each of the plurality of residential circuit breakers connected between a power line of a residential wiring system and a load, the method comprising the steps of:
   a) establishing communication with a desired residential electronic circuit breaker, the step of establishing communication including the steps of:
   transmitting a signaling waveform on the power line of the residential wiring system to the desired circuit breaker;
   detecting the signaling waveform as request to establish communication with the desired circuit breaker; and
   transmitting a reply waveform to accept the request to establish communication with the desired circuit breaker;
   b) transmitting a portion of the program to the desired circuit breaker after communication has been established; and
   c) storing the portion of the program in the desired circuit breaker to reprogram the desired circuit breaker.

2. The method of claim 1 wherein the step of establishing communication further includes the step of generating a first waveform with a first polarity in the desired circuit breaker in response to the signaling waveform on the power line.

3. The method of claim 1 wherein the step of establishing communication further includes generating an unsymmetrical waveform in the desired circuit breaker in response to the signaling waveform on the power line.

4. The method of claim 2 wherein the step of detecting the signaling waveform includes the step of detecting the first polarity of the first waveform as the request for the establishment of communication with the desired circuit breaker.

5. The method of claim 1 further comprises the step of, prior to the step of establishing communication, selectively connecting a programmer to a portion of the residential electrical wiring system in which the desired breaker is intended to protect to enable the programmer to generate the signaling waveform on the power line of the electrical wiring system.

6. The method of claim 5 wherein the programmer includes a transformer having a primary winding connected to the power line of the electrical wiring system and a secondary winding, the step of establishing communication further comprises the step of inducing a waveform on the primary winding of the transformer, thereby generating the signaling waveform on the power line of the residential electrical wiring system.

7. The method of claim 6 wherein the desired circuit breaker includes a transformer having a primary winding connected between the power line and the load and a secondary winding, the of step of detecting the signaling waveform includes the step of measuring the voltage on the secondary winding of the transformer in the desired circuit breaker.

8. The method of claim 6 wherein the step of establishing communication further includes generating a repetitive sawtooth waveform on the secondary winding of the transformer within the programmer having a magnitude with a slow rise time and fast fall time.

9. The method of claim 4 wherein the step of establishing communication includes the step of ignoring any waveform having a polarity that differs from the first polarity.

10. A programmer for communicating with and reprogramming a residential electronic circuit breaker, the programmer comprising:
- a connector selectively connecting the programmer to a portion of a residential electrical wiring system in which the residential electronic circuit breaker is intended to protect;
- a microcontroller controlling the operation of the programmer;
- a storage device storing a program relating to the operation of the electronic circuit breaker; and
- a communications component electrically connected to the microcontroller, the storage device and the connector communicating with and transmitting the program to the circuit breaker to reprogram the circuit breaker, and
- wherein the communications component includes a transformer and a capacitor connected in series therewith, the transformer and capacitor connected across a power line and a neutral line of the residential electrical wiring system, the programmer transformer being configured to transmit a signaling waveform on the power line, thereby generating a waveform with a first polarity on the transformer of the circuit breaker.

11. The programmer of claim 10 wherein the storage device is internal or external to the microcontroller.

12. The programmer of claim 10 wherein the connector is configured to connect the programmer to an electrical wall outlet in a room of a residence.

13. The programmer of claim 10 wherein the programmer is configured to transmit the program wirelessly to the circuit breaker.

14. The programmer of claim 10 wherein the communications component further includes a communications transmitter connected to the transformer transmitting a waveform that induces the waveform on the power line of the residential wiring system.

15. The programmer of claim 14 further comprises a communication receiver receiving an acceptance waveform generated by the circuit breaker to establish communication between the programmer and the circuit breaker.

* * * * *